(12) United States Patent
Assarpour et al.

(10) Patent No.: US 8,832,350 B2
(45) Date of Patent: Sep. 9, 2014

(54) METHOD AND APPARATUS FOR EFFICIENT MEMORY BANK UTILIZATION IN MULTI-THREADED PACKET PROCESSORS

(75) Inventors: Hamid Assarpour, Arlington, MA (US); Mike Craren, Holliston, MA (US); Rich Modelski, Hollis, NH (US)

(73) Assignee: Avaya Inc., Basking Ridge, NJ (US)

( * ) Notice: Subject to any disclaimer, the term of this patent is extended or adjusted under 35 U.S.C. 154(b) by 551 days.

(21) Appl. No.: 12/953,956

(22) Filed: Nov. 24, 2010

(65) Prior Publication Data

US 2011/0320680 A1    Dec. 29, 2011

Related U.S. Application Data

(60) Provisional application No. 61/359,076, filed on Jun. 28, 2010.

(51) Int. Cl.
*G06F 12/06* (2006.01)
*H04L 12/56* (2006.01)
*H04L 12/46* (2006.01)

(52) U.S. Cl.
CPC ............ *H04L 12/4625* (2013.01); *H04L 45/54* (2013.01)
USPC ....................................... 711/5; 711/E12.082

(58) Field of Classification Search
USPC ................................................ 711/5, E12.082
See application file for complete search history.

(56) References Cited

U.S. PATENT DOCUMENTS

| | | | |
|---|---|---|---|
| 6,393,026 B1 * | 5/2002 | Irwin | 370/401 |
| 6,480,471 B1 * | 11/2002 | VanZante et al. | 370/252 |
| 2008/0140980 A1 * | 6/2008 | Mei et al. | 711/170 |

* cited by examiner

*Primary Examiner* — Jasmine Song
(74) *Attorney, Agent, or Firm* — Anderson Gorecki & Rouille LLP

(57) ABSTRACT

A method and apparatus for efficient memory bank utilization in multi-threaded packet processors is presented. A plurality of memory access requests, are received and are buffered by a plurality of memory First In First Out (FIFO) buffers, each of the memory FIFO buffers in communication with a memory controller. The memory access requests are distributed evenly across said memory banks by way of the memory controller. This reduces and/or eliminates memory latency which can occur when sequential memory operations are performed on the same memory bank.

16 Claims, 3 Drawing Sheets

METHOD AND APPARATUS FOR EFFICIENT MEMORY BANK UTILIZATION IN MULTI-THREADED PACKET PROCESSORS

CROSS REFERENCE TO RELATED APPLICATIONS

The present application claims the benefit of U.S. Provisional Patent Application No. 61/359,076, filed on Jun. 28, 2010, which is incorporated herein by reference in its entirety.

BACKGROUND

Packet processors are used in network devices to handle the routing of packets. Packet processors are typically implemented as RISC (Reduced Instruction Set Computers) processor. In some instances these packet processors are implemented as programmable/multithreaded devices. The key benefits of multi-threaded packet processors include simpler instruction execution pipeline eliminating pipeline hazards, resource conflicts, branch delays, pipeline stalls, and pipeline stage bypasses. Another advantage of these type of processors is they provide a simpler programming model by hiding memory access latencies, hiding coprocessor latencies, eliminating branch delays, removing operand dependencies, provide better utilization of available memory bandwidth and better utilization of coprocessors. To increase memory capacity and/or reduce cost, packet processors have made use of Reduced Latency Dynamic Random Access Memory (RLDRAM) and Synchronous Dynamic Random Access Memory (SDRAM).

SUMMARY

Conventional mechanisms such as those explained above suffer from a variety of deficiencies. One such deficiency is that the memory used by these packet processors are implemented as a series of banks. Of particular concern for a banked memory is the substantially increased latency incurred when sequential memory operations are performed on the same bank. Additionally, when this happens, the remaining banks are not utilized. The net result is longer overall access time to memory. In a packet processing environment with a fixed inter packet time to process a packet, the extra access time can exceed the time to process the packet, resulting in reduced packet performance.

Embodiments of the invention significantly overcome such deficiencies and provide mechanisms and techniques that provide efficient memory bank utilization in multi-threaded packet processors. The method utilizes a fine-grained packet processor in conjunction with data-structure type dependent address mapping to distribute memory accesses evenly across all memory banks.

In a particular embodiment of a method for providing efficient memory bank utilization in multi-threaded packet processors, the method includes receiving a plurality of memory access requests, the memory including a plurality of memory banks. The method further includes buffering the memory access requests with a plurality of memory First In First Out (FIFO) buffers (one for each memory bank), each of the memory FIFO buffers in communication with a memory controller. Additionally the method includes distributing the memory access requests evenly across the memory banks by way of the memory controller, such that or Field Programmable Gate Array (FPGA) memory accesses are distributed evenly across all memory banks.

Still other embodiments include a computerized device (e.g., a packet processor), configured to process all the method operations disclosed herein as embodiments of the invention. In such embodiments, the computerized device includes a memory system, a processor, communications interface in an interconnection mechanism connecting these components. The memory system is encoded with a process that provides efficient memory bank utilization in multi-threaded packet processors as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing efficient memory bank utilization in multi-threaded packet processor as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a packet processing device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

To increase memory capacity and/or reduce cost, packet processors have made use of Reduced Latency Dynamic Random Access Memory (RLDRAM) devices and/or Synchronous Dynamic Random Access Memory (SDRAM) devices. Both memory technologies are implemented as a series of banks. Of particular concern for a banked memory is the substantially increased latency incurred when sequential memory operations are performed on the same memory bank, rather than over a series of memory banks. Additionally, when this happens, the remaining memory banks are not utilized. The net result is longer overall access time to memory. In a packet processing environment with a fixed inter packet time to process a packet, the extra access time can exceed the time to process the packet, resulting in reduced packet performance.

One goal of the presently described method and apparatus for performing memory bank utilization in multi-threaded packet processors is to keep all memory banks fully utilized with little if any sequential access to a same memory bank. The presently disclosed method utilizes a fine-grained multi-threaded packet processor in conjunction with data-structure type dependent address mapping to distribute memory accesses evenly across all memory banks. The method uses a FIFO (first in first out) buffer for each memory bank. Each FIFO is used to buffer an operation request to memory. The depth of the FIFO is determined empirically, based on the particular configuration (processor speed, memory speed, number of threads, etc). The FIFO depth is large enough to prevent the FIFOs from filling during steady state operation.

In a multi-threaded packet processor each thread processes a packet until completion. The memory access patterns that a thread produces are both flow dependent and packet type dependent. For instance, the memory addresses to access hash tables are flow dependent which vary for packets in different flows. This scheme uses two methods to map the addresses of the data structures to memory banks depending on the data structure type that an application uses: 1) linear mode (also referred to herein as intra-bank memory) where consecutive memory words are stored in consecutive memory banks, and 2) block mode (also referred to herein as inter-bank memory) where a block of consecutive memory words are stored in one memory bank and then continues to the next bank. By appropriately applying linear mode and block mode in allocation of memory for various types of data structures combined with high number of packet processing threads increases the probability of even distribution of accesses across all memory banks.

Figure 1:
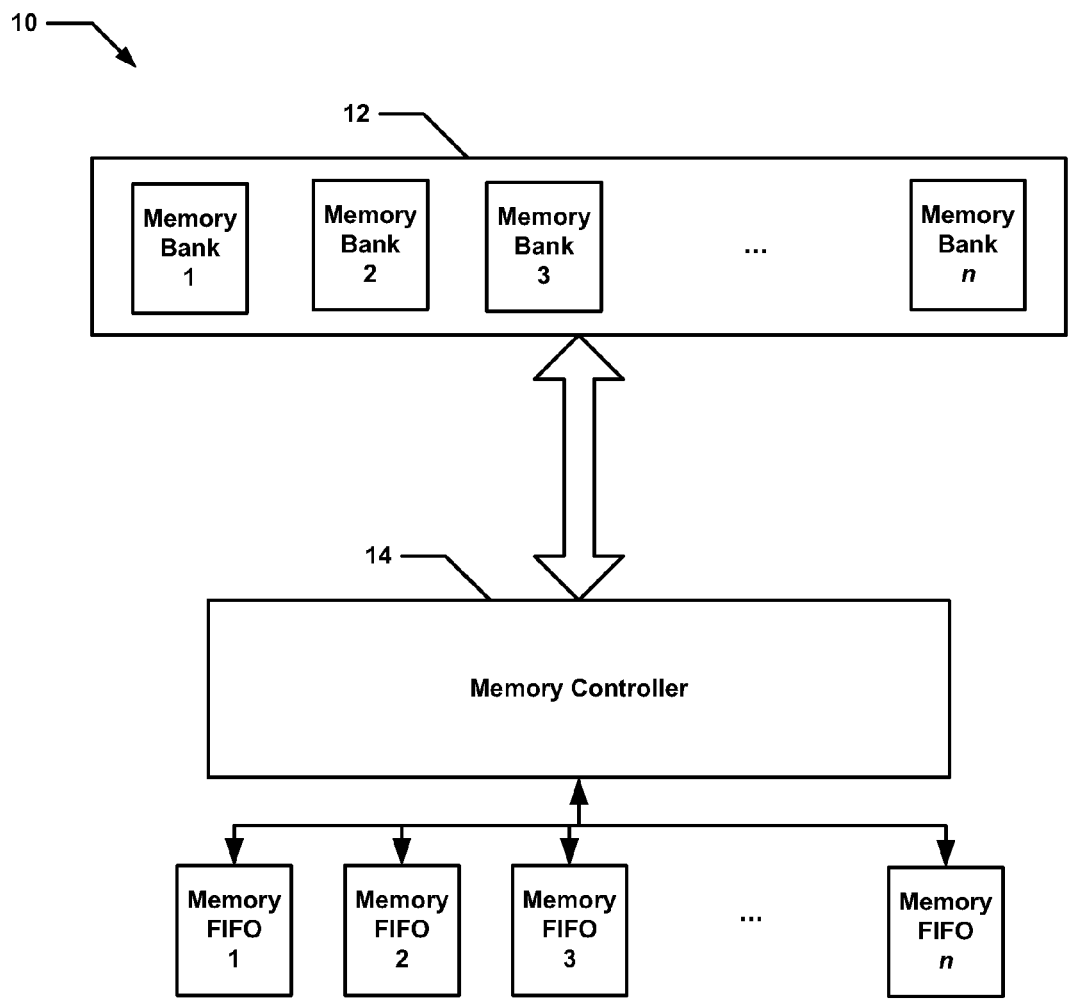
FIG. 1 illustrates an example memory system architecture for a multithreaded packet processor system that performs memory bank utilization in multi-threaded packet processors in accordance with embodiments of the invention.

Referring now to FIG. 1, a memory system 10 for a multi-threaded packet processing system is shown. System 10 includes a memory 12 in communication with a memory controller 14 which is in communication with a plurality of memory FIFOs. Memory 12 includes a plurality of memory banks (either RLDRAM or SDRAM referred to collectively as simply DRAM).

In the present memory system an address provided is used to perform a read function or a write function at that address. Part of the address is decoded and a particular memory bank selected, and the remainder of the address determines a particular location within the selected memory bank. Since the memory banks are independent, the nature of the DRAM is that there are latencies when starting up the DRAM access for the first word, then the remaining words can be accessed with little or no latency. In the case where a memory operation is accessing a particular bank, and the next operation is to access the same bank, there is a conflict, and the system has to stall until the access finishes. If the next access is for a different bank, then the system can start accessing that bank without having to stall and wait for the previous access to finish.

The present invention provides a memory FIFO buffer for each memory bank. The FIFO buffers are used to buffer requests from multiple packet threads destined for each memory bank. The memory controller will cycle through each FIFO, performing a request to the corresponding memory bank. In so doing, the controller performs a request to the memory bank if there is a request pending in the FIFO. In this scheme, as long as each FIFO has pending requests (as determined empirically), the memory banks are fully utilized with minimum latency. Also, in this scheme, the controller never makes a sequential access to the same memory bank, and thus prevents the large latency incurred by doing this. Each memory FIFO buffer includes both a read and write data FIFO. Each memory FIFO buffer further includes and an address FIFO. An address decoder decodes an address and determines which memory bank the address relates to. The address is placed in the memory FIFO buffer that corresponds to the destination memory bank for the particular address. The next address is decoded and the process repeated The memory FIFO buffers are in communication with a memory controller 14 that knows which memory banks are busy or ready and knows which memory FIFO buffers have available data. The controller 14 matches the bandwidth of the memory FIFO buffers and the memory to provide maximum bus usage and minimal stalling.

The multi-threading aspect provides a measure of depth. A memory bank conflict occurs when a memory bank is busy and a new request is going to the same memory bank. In order to minimize memory bank conflicts, the multithreaded architecture, due to the many threads being executed concurrently, tends to generate a larger amount of addresses having a wider distribution, therefore it is desirable to keep all the memory banks active. The more threads, the better utilization of the memory banks. If there are not a lot of threads, the memory FIFO buffers do not remain full and the system could end up with some memory FIFO buffers full while others memory FIFO buffers are empty. Note, that in the worst case, if only a single FIFO has requests, and the rest of the FIFOs are empty, the behavior will revert to a system in which all memory requests result in sequential access to the same bank.

The memory 12 can be sequential, striped or a combination thereof. The arrangement of the memory addresses is selectable based on the application. For example a hashing algorithm may use linear (across banks or intra-bank) memory addressing while a Radix algorithm may use bank mode (inter-bank).

Figure 2:
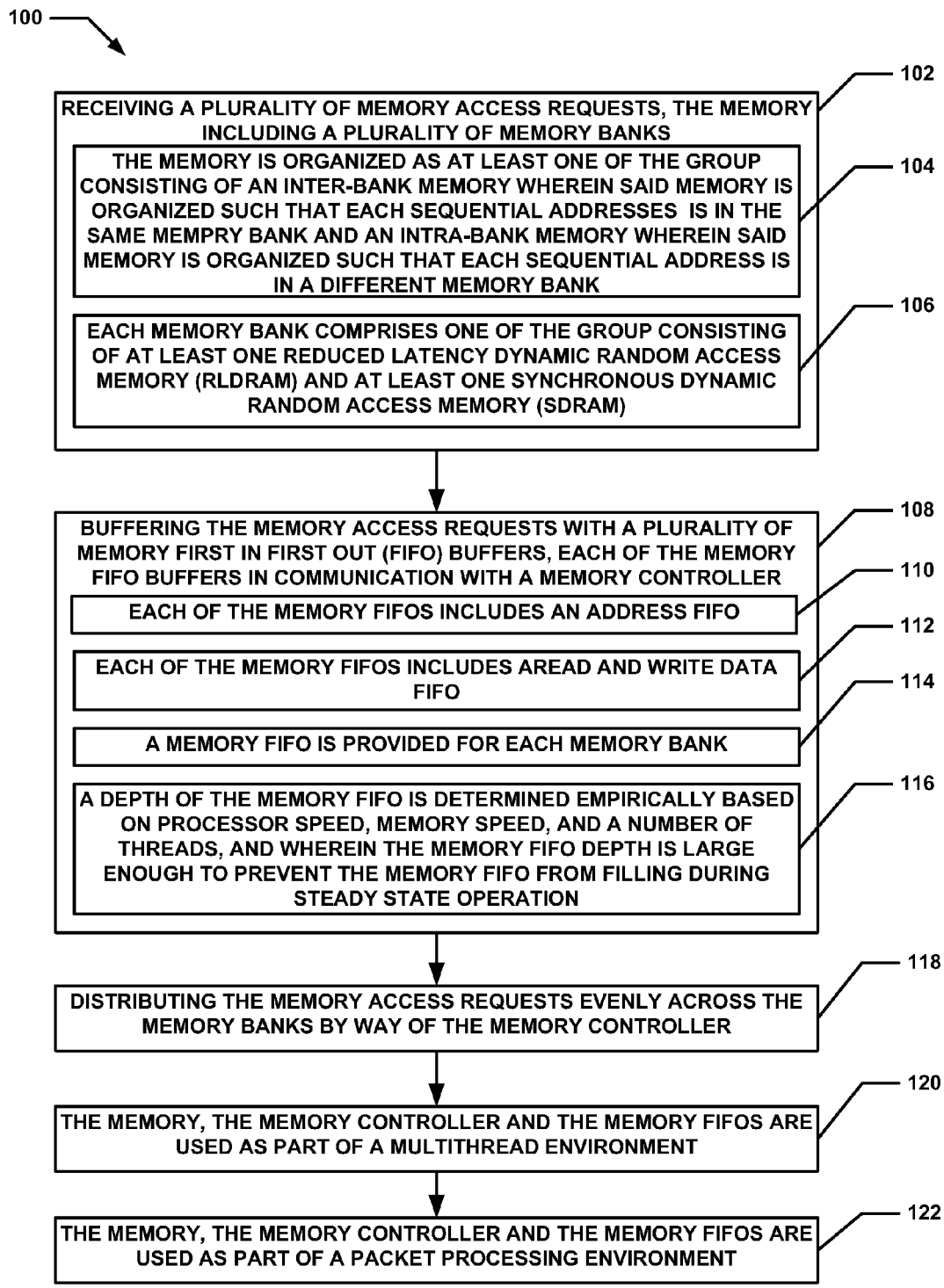
FIG. 2 comprises a flow diagram of a particular embodiment of a method for performing memory bank utilization in multi-threaded packet processors in accordance with embodiments of the invention.

A flow chart of a particular embodiment of the presently disclosed method for efficient memory bank utilization in multi-threaded packet processors is depicted in FIG. 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC) or Field Programmable Gate Array (FPGA). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a method 100 for performing memory bank utilization in multi-threaded packet processors is shown. Method 100 begins with processing block 102 which discloses receiving a plurality of memory access requests, the memory including a plurality of memory banks. As shown in processing block 104 the memory is organized as at least one of the group consisting of an inter-bank memory wherein each memory bank contains sequential addresses and an intra-bank memory wherein each sequential address is in a different memory bank. The arrangement of the memory addresses is selectable based on the application. For example a hashing algorithm may use linear (across banks or intra-bank) memory addressing while a Radix algorithm may use bank mode (inter-bank). As further shown in processing block 106 each memory bank comprises one of the group consisting of at least one Reduced Latency Dynamic Random Access Memory (RLDRAM) and at least one Synchronous Dynamic Random Access Memory (SDRAM).

Processing block 108 recites buffering the memory access requests with a plurality of memory First In First Out (FIFO) buffers, each of the memory FIFO buffers in communication with a memory controller. Processing block 110 states each of the memory FIFOs includes an address FIFO, while processing block 112 states each of the memory FIFOs further includes a read and write data FIFO. As shown in processing block 114 a memory FIFO is provided for each memory bank. Processing block 116 states a depth of the memory FIFO is determined empirically based on processor speed, memory speed, and a number of threads, and wherein the memory FIFO depth is large enough to prevent the memory FIFO from filling during steady state operation.

Processing block 118 discloses distributing the memory access requests evenly across the memory banks by way of the memory controller. The controller 14 matches the bandwidth of FIFOs and memory to provide maximum bus usage and minimal stalling.

Processing block 120 states the memory, the memory controller and the memory FIFOs are used as part of a multithread environment, and processing block 122 states the memory, the memory controller and the memory FIFOs are used as part of a packet processing environment.

Figure 3:
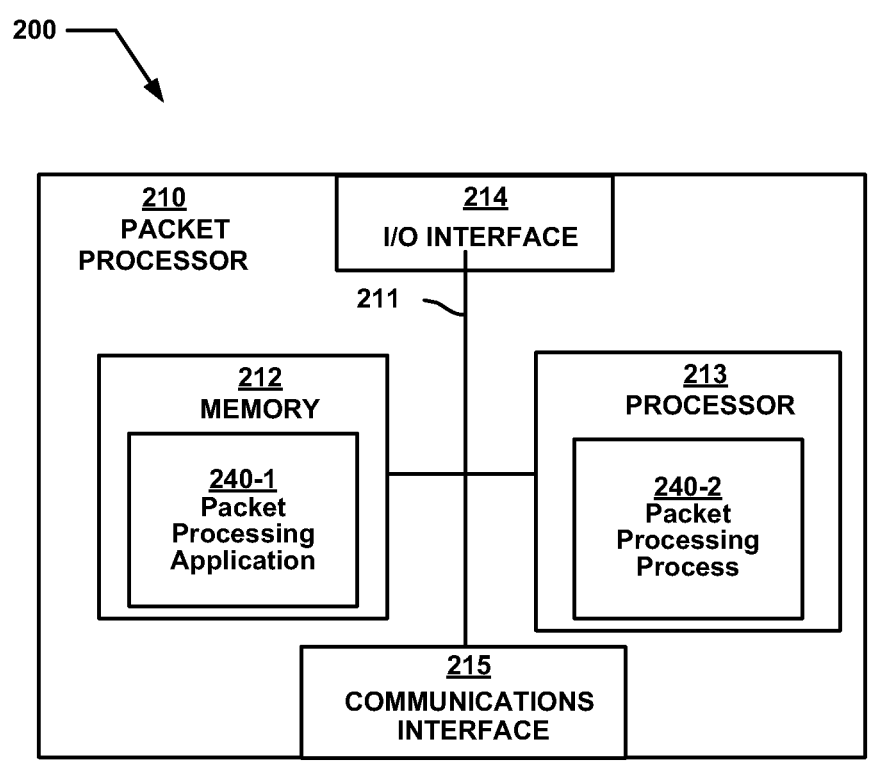
FIG. 3 illustrates an example computer system architecture for a packet processing system that performs memory bank utilization in multi-threaded packet processors in accordance with embodiments of the invention.

FIG. 3 is a block diagram illustrating example architecture of a computer system (e.g., a packet processor) 110 that executes, runs, interprets, operates or otherwise performs a packet processing application 140-1 and packet processing process 140-2 suitable for use in explaining example configurations disclosed herein. An input device 116 (e.g., one or more customer/developer controlled devices such as a keyboard, mouse, etc.) couples to processor 113 through I/O interface 114, and enables a customer 108 to provide input commands, and generally control the graphical customer interface 160. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a packet processing application 140-1 as explained herein. The packet processing application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of a packet processing application 140-1. Execution of a packet processing application 140-1 in this manner produces processing functionality in the packet processing process 140-2. In other words, the packet processing process 140-2 represents one or more portions or runtime instances of a packet processing application 140-1 (or the entire a packet processing application 140-1) performing or executing within or upon the processor 113 in the computerized device 110 at runtime.

It is noted that example configurations disclosed herein include the packet processing application 140-1 itself (i.e., in the form of un-executed or non-performing logic instructions and/or data). The packet processing application 140-1 may be stored on a computer readable medium (such as a floppy disk), hard disk, electronic, magnetic, optical, or other computer readable medium. A packet processing application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a packet processing application 140-1 in the processor 113 as the packet processing process 140-2. Those skilled in the art will understand that the computer system 110 may include other processes and/or software and hardware components, such as an operating system not shown in this example.

During operation, processor 113 of computer system 100 accesses memory system 112 via the interconnect 111 in order to launch, run, execute, interpret or otherwise perform the logic instructions of the packet processing application 140-1. Execution of packet processing application 140-1 produces processing functionality in packet processing process 140-2. In other words, the packet processing process 140-2 represents one or more portions of the packet processing application 140-1 (or the entire application) performing within or upon the processor 113 in the computer system 100.

It should be noted that, in addition to the packet processing process 140-2, embodiments herein include the packet processing application 140-1 itself (i.e., the un-executed or non-performing logic instructions and/or data). The packet processing application 140-1 can be stored on a computer readable medium such as a floppy disk, hard disk, or optical medium. The packet processing application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of packet processing application 140-1 in processor 113 as the packet processing process 140-2. Those skilled in the art will understand that the computer system 100 can include other processes and/or software and hardware components, such as an operating system that controls allocation and use of hardware resources associated with the computer system 100.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. An apparatus comprising:
   a memory including a plurality of memory banks;
   a memory controller in bidirectional communication with said memory; and
   a plurality of memory First In First Out (FIFO) buffers, each of said memory FIFO buffers in bidirectional communication with said memory controller, each memory FIFO buffer operational to buffer a request to said memory and wherein said memory controller distributes memory accesses evenly across said memory banks, and wherein a depth of said memory FIFO is determined empirically based on processor speed, memory speed, and a number of threads, and wherein said memory FIFO depth is large enough to prevent said memory FIFO from filling during steady state operation.

2. The apparatus of claim 1 wherein said memory, said memory controller and said memory FIFOs are used as part of a multithread environment.

3. The apparatus of claim 1 wherein each of said memory FIFOs includes an address FIFO.

4. The apparatus of claim 1 wherein each of said memory FIFOs includes a read and write data FIFO.

5. The apparatus of claim 1 wherein said memory is organized as at least one of the group consisting of an inter-bank memory wherein said memory is organized such that each sequential address is the same memory bank and an intra-bank memory wherein said memory is organized such that each sequential address is in a different memory bank.

6. The apparatus of claim 1 wherein each memory bank comprises one of the group consisting of at least one Reduced Latency Dynamic Random Access Memory (RLDRAM) and at least one Synchronous Dynamic Random Access Memory (SDRAM).

7. The apparatus of claim 1 wherein a memory FIFO is provided for each memory bank.

8. The apparatus of claim 1 wherein said memory, said memory controller and said memory FIFOs are used as part of a packet processing environment.

9. A computer-implemented method in which a computer system performs operations comprising:
   receiving a plurality of memory access requests in a system having a memory including a plurality of memory banks, a plurality of memory First In First Out (FIFO) buffers and a memory controller in bidirectional communication with a memory;
   buffering said memory access requests with said memory FIFO buffers, each of said memory FIFO buffers in bidirectional communication with said memory controller; and
   distributing said memory access requests evenly across said memory banks by way of said memory controller, and wherein a depth of said memory FIFO is determined empirically based on processor speed, memory speed, and a number of threads, and wherein said memory FIFO depth is large enough to prevent said memory FIFO from filling during steady state operation.

10. The method of claim 9 wherein said memory, said memory controller and said memory FIFOs are used as part of a multithread environment.

11. The method of claim 9 wherein each of said memory FIFOs includes an address FIFO.

12. The method of claim 9 wherein each of said memory FIFOs includes a read and write data FIFO.

13. The method of claim 9 wherein said memory is organized as at least one of the group consisting of an inter-bank memory wherein said memory is organized such that each sequential address is the same memory bank and an intra-bank memory wherein said memory is organized such that each sequential address is in a different memory bank.

14. The method of claim 9 wherein each memory bank comprises one of the group consisting of at least one Reduced Latency Dynamic Random Access Memory (RLDRAM) and at least one Synchronous Dynamic Random Access Memory (SDRAM).

15. The method of claim 9 wherein said memory, said memory controller and said memory FIFOs are used as part of a packet processing environment.

16. The method of claim 10 wherein a memory FIFO is provided for each memory bank.

* * * * *